United States Patent
Klein

(10) Patent No.: US 12,046,004 B2
(45) Date of Patent: Jul. 23, 2024

(54) DETERMINING OBJECT POSE FROM IMAGE DATA

(71) Applicant: ZETA MOTION LTD., Fleet (GB)

(72) Inventor: Wilhelm Eduard Jonathan Klein, Castell (DE)

(73) Assignee: ZETA MOTION LTD., Fleet (GB)

( * ) Notice: Subject to any disclaimer, the term of this patent is extended or adjusted under 35 U.S.C. 154(b) by 38 days.

(21) Appl. No.: 17/638,843

(22) PCT Filed: Aug. 27, 2020

(86) PCT No.: PCT/GB2020/052052
§ 371 (c)(1),
(2) Date: Feb. 27, 2022

(87) PCT Pub. No.: WO2021/038227
PCT Pub. Date: Mar. 4, 2021

(65) Prior Publication Data
US 2022/0301221 A1 Sep. 22, 2022

(30) Foreign Application Priority Data
Aug. 27, 2019 (GB) .................................... 1912259

(51) Int. Cl.
*G06T 7/73* (2017.01)
*G06F 3/01* (2006.01)
(Continued)

(52) U.S. Cl.
CPC ................ *G06T 7/74* (2017.01); *G06F 3/011* (2013.01); *G06F 18/214* (2023.01);
(Continued)

(58) Field of Classification Search
CPC .. G06T 7/74; G06T 7/20; G06T 15/20; G06T 2200/04; G06T 2207/10016;
(Continued)

(56) References Cited

U.S. PATENT DOCUMENTS 8,224,024 B2   7/2012  Foxlin et al.
9,235,051 B2 * 1/2016  Salter ...................... G06F 3/011
(Continued)

FOREIGN PATENT DOCUMENTS

EP   3395418 A1   10/2018

OTHER PUBLICATIONS

"Improper or bad rotation estimation with solvePnP in some cases," Github OpenCV Issue #8813, posted May 28, 2017, discussion thread printed Jul. 24, 2019, https://github.com/opencv/opencv/issues/8813 (13 pages).
(Continued)

*Primary Examiner* — Vijay Shankar
(74) *Attorney, Agent, or Firm* — McCarter & English, LLP

(57) ABSTRACT

Systems and methods for determining pose using a trained neural network are described, whereby a user device receives image data of a 3-dimensional ("3D") marker affixed to a 3D object to be tracked, provides a set of input data derived from the image data to a neural network stored on the user device, and generates a pose descriptor indicative of estimated pose of the 3D marker based on output of the neural network produced in response to receiving the set of input data. The 3D marker comprises a first surface to convey radiation in a first direction, and a second surface to convey radiation in a second direction different to the first direction, whereby the image processing system determines object pose from captured image data of at least a portion of the radiation conveyed from the first and/or second surface of the 3D marker affixed to the 3D object.

20 Claims, 12 Drawing Sheets

(51) Int. Cl.
    G06F 18/214     (2023.01)
    G06F 18/2431    (2023.01)
    G06T 7/20       (2017.01)
    G06T 15/20      (2011.01)
(52) U.S. Cl.
    CPC ............ *G06F 18/2431* (2023.01); *G06T 7/20* (2013.01); *G06T 15/20* (2013.01); *G06T 2200/04* (2013.01); *G06T 2207/10016* (2013.01); *G06T 2207/20081* (2013.01); *G06T 2207/20084* (2013.01); *G06T 2207/30204* (2013.01)
(58) Field of Classification Search
    CPC . G06T 2207/20081; G06T 2207/20084; G06T 2207/30204; G06T 7/246; G06T 7/251; G06T 13/40; G06F 3/011; G06F 3/013; G06F 3/016; G06F 3/017; G06F 18/214; G06F 18/2431; A61B 2090/3929; A61B 2090/3937; G06V 30/194
    See application file for complete search history.

(56) References Cited

U.S. PATENT DOCUMENTS

| | | | |
|---|---|---|---|
| 9,830,491 B2 | 11/2017 | Laurent et al. | |
| 10,593,101 B1* | 3/2020 | Han | G06T 7/55 |
| 10,692,239 B2* | 6/2020 | Hong | G06T 7/70 |
| 10,913,125 B2* | 2/2021 | Meess | A61F 9/064 |
| 11,127,206 B2* | 9/2021 | Chachek | G06T 17/10 |
| 11,277,597 B1* | 3/2022 | Canberk | G06V 20/20 |
| 2013/0328927 A1* | 12/2013 | Mount | G06F 3/017 345/633 |
| 2014/0368533 A1* | 12/2014 | Salter | G06F 3/04815 345/619 |
| 2016/0357261 A1 | 12/2016 | Bristol et al. | |
| 2020/0242834 A1* | 7/2020 | Chachek | G06T 15/08 |

OTHER PUBLICATIONS

A. Amor-Martinez, et al., "Planar POP: Feature-less pose estimation with applications in UAV localization," 2016 IEEE International Symposium on Safety, Security, and Rescue Robotics (SSRR), Oct. 2016 (6 pages).
D. Avola et al., "A Practical Framework for the Development of Augmented Reality Applications by using ArUco Markers," ICPRAM 2016—International Conference on Pattern Recognition Applications and Methods, Jan. 2016 (10 pages).
A. Babinec et al., "Visual localization of mobile robot using artificial markers," Procedia Engineering, vol. 96, 2014 (9 pages).
S. Basiratzadeh et al., "Fiducial Marker Approach for Biomechanical Smartphone-Based Measurements," IEEE 3rd International Conference on Bio-engineering for Smart Technologies (BioSMART), Apr. 2019 (4 pages).
B. Benligiray et al., "STag: A Stable Fiducial Marker System," Image and Vision Computing, Jul. 2019 (28 pages).
F. Bergamasco et al., "An Accurate and Robust Artificial Marker based on Cyclic Codes," IEEE Transactions On Pattern Analysis And Machine Intelligence, Jan. 2016 (16 pages).
F. Bergamasco et al., "Pi-Tag: a fast image-space marker design based on projective invariants," Machine Vision and Applications, vol. 24, pp. 1295-1310, Dec. 2012 (16 pages).
T. Birdal et al., "X-Tag: A Fiducial Tag for Flexible and Accurate Bundle Adjustment," IEEE 4th International Conference on 3D Vision (3DV), Oct. 2016 (9 pages).
V. Bonnet et al., "Toward an affordable and user-friendly visual motion capture system," EMBC 2014: International IEEE Engineering in Medicine and Biology Society Conference on Neural Engineering, Aug. 2014 (4 pages).
V. Bonnet et al., "Towards an affordable mobile analysis platform for pathological walking assessment," Robotics and Autonomous Systems, vol. 66, Jan. 2015, pp. 116-128 (13 pages).
Buaes, "A Low Cost One-Camera Optical Tracking System for Indoor Wide-Area Augmented and Virtual Reality Environments," Dissertation for Master Degree in Electrical Engineering, Federal University of Rio Grande do Sul, Feb. 2006 (171 pages).
A.K. Dash et al., "Designing of marker-based augmented reality learning environment for kids using convolutional neural network architecture," Displays, vol. 55, Dec. 2018, pp. 46-54 (9 pages).
J. DeGol et al., "ChromaTag: A Colored Marker and Fast Detection Algorithm," 2017 IEEE International Conference on Computer Vision (ICCV), Oct. 2017 (10 pages).
A. Ehambram et al., "An Approach to Marker Detection in IR- and RGB-images for an Augmented Reality Marker," 16th International Conference on Informatics in Control, Automation and Robotics (ICINCO), Jan. 2019 (8 pages).
M. Faessler et al. "A Monocular Pose Estimation System based on Infrared LEDs," 2014 IEEE International Conference on Robotics and Automation (ICRA), Jun. 2014 (7 pages).
M. A. Ghazi et al., "Monocular Vision-Based Motion Capture System: A Performance Model," 2017 IEEE International Symposium on Robotics and Intelligent Sensors (IRIS2017), Oct. 2017 (6 pages).
J. Gubbi et al., "Robust Markers for Visual Navigation using Reed-Solomon Codes," 15th IAPR International Conference on Machine Vision Applications (MVA), May 2017 (4 pages).
T. Kiyokawa et al., "Fully Automated Annotation With Noise-Masked Visual Markers for Deep-Learning-Based Object Detection," IEEE Robotics and Automation Letters, vol. 4, No. 2, Apr. 2019 (6 pages).
K. Kjærside et al., "ARDressCode: Augmented Dressing Room with Tag-based Motion Tracking and Real-Time Clothes Simulation," Central European Multimedia and Virtual Reality Conference, 2005 (6 pages).
M. Krogius et al., "Flexible Tag Layouts for the AprilTag Fiducial System," 2019 IEEE/RSJ International Conference on Intelligent Robots and Systems (IROS), Nov. 2019 (7 pages).
D. Kruse et al., "A Sensor-Based Dual-Arm Tele-Robotic System," IEEE Transactions on Automation Science and Engineering, Jan. 2015 (16 pages).
P. Lightbody et al., "A Versatile High-Performance Visual Fiducial Marker Detection System with Scalable Identity," SAC 2017: Symposium on Applied Computing, Apr. 2017 (7 pages).
P. Lightbody et al., "An Efficient Visual Fiducial Localisation System," ACM SIGAPP Applied Computing Review, vol. 17, No. 3, Sep. 2017 (10 pages).
Y. Liu et al., "Human-Readable Fiducial Marker Classification using Convolutional Neural Networks," 2017 IEEE International Conference on Electro Information Technology (EIT), May 2017 (5 pages).
R. Muñoz-Salinas et al., "Mapping and Localization from Planar Markers," Pattern Recognition, Jan. 2017 (16 pages).
R. Muñoz-Salinas et al., "SPM-SLAM: Simultaneous Localization and Mapping with Squared Planar Markers," Pattern Recognition, Sep. 2018 (35 pages).
R. Muñoz-Salinas et al., "UcoSLAM: Simultaneous Localization and Mapping by Fusion of KeyPoints and Squared Planar Markers," Pattern Recognition, Feb. 2019 (18 pages).
S. Pokhrel et al., "A novel augmented reality (AR) scheme for knee replacement surgery by considering cutting error accuracy," International Journal of Medical Robotics and Computer Assisted Surgery, Sep. 2018 (15 pages).
T. Probst et al., "Automatic Tool Landmark Detection for Stereo Vision in Robot-Assisted Retinal Surgery," IEEE Robotics and Automation Letters, vol. 3, No. 1, Nov. 2017 (8 pages).
A. Sagitov et al., "ARTag, AprilTag and CALTag Fiducial Marker Systems: Comparison in a Presence of Partial Marker Occlusion and Rotation," ICINCO 2017—14th International Conference on Informatics in Control, Automation and Robotics, Jul. 2017 (10 pages).

(56) References Cited

OTHER PUBLICATIONS

A. Sagitov et al., "Comparing Fiducial Marker Systems in the Presence of Occlusion," 2017 International Conference on Mechanical, System and Control Engineering (ICMSC), May 2017 (6 pages).

J. Sandoval et al., "Collaborative framework for robot-assisted minimally invasive surgery using a 7-DoF anthropomorphic robot," Robotics and Autonomous Systems, vol. 106, pp. 95-106, May 2018 (12 pages).

H. Sarmadi et al., "Simultaneous Multi-View Camera Pose Estimation and Object Tracking With Squared Planar Markers," IEEE Access, vol. 7, Jan. 2019, pp. 22927-22940 (14 pages).

A.C. Sementille et al., "A Motion Capture System Using Passive Markers," ACM SIGGRAPH International Conference on Virtual Reality Continuum and its Applications in Industry (VRCAI), Jun. 2004 (8 pages).

A. J. Smith et al., "Low Cost Alternative to Motion Capture Systems for Indoor Flight Testing Using On-board Computer Vision," AIAA Atmospheric Flight Mechanics Conference, Jan. 2016 (9 pages).

M.E. Tiryaki et al., "Printing-while-moving: a new paradigm for large-scale robotic 3D Printing," 2019 IEEE/RSJ International Conference on Intelligent Robots and Systems (IROS), Sep. 2018 (6 pages).

CY Tsai et al., "Efficient Model-Based Object Pose Estimation Based on Multi-Template Tracking and PnP Algorithms," Algorithms, vol. 11, 122, Aug. 2018 (14 pages).

P. Wacker et al., "ARPen: Mid-Air Object Manipulation Techniques for a Bimanual AR System with Pen & Smartphone," CHI 2019: Conference on Human Factors in Computing Systems, May 2019 (12 pages).

J. Wang et al., "AprilTag 2: Efficient and Robust Fiducial Detection," 2016 IEEE/RSJ International Conference on Intelligent Robots and Systems (IROS), Oct. 2016, (6 pages).

Y. Watanabe et al., "Extended Dot Cluster Marker for High-speed 3D Tracking in Dynamic Projection Mapping," 2017 EEE International Symposium on Mixed and Augmented Reality (ISMAR), Oct. 2017 (10 pages).

PC Wu et al., "DodecaPen: Accurate 6DoF Tracking of a Passive Stylus," UIST 2017: 30th ACM Symposium on User Interface Software and Technology, Oct. 2017 (10 pages).

\* cited by examiner

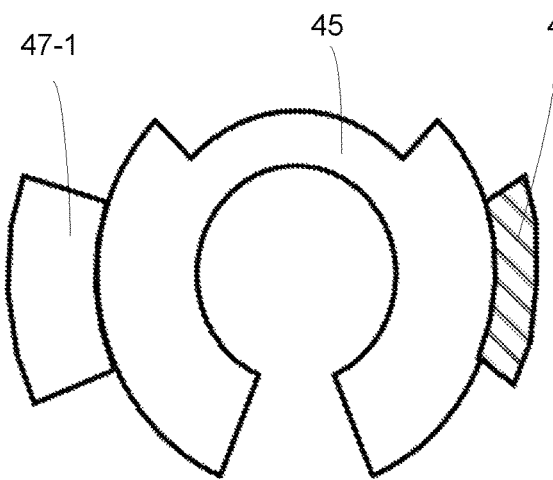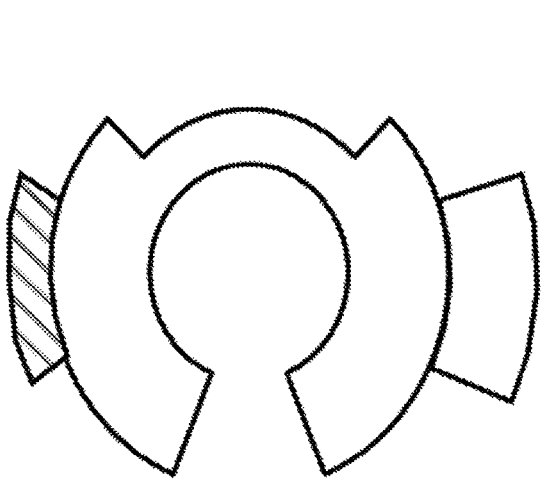
Fig. 2D      Fig. 2E
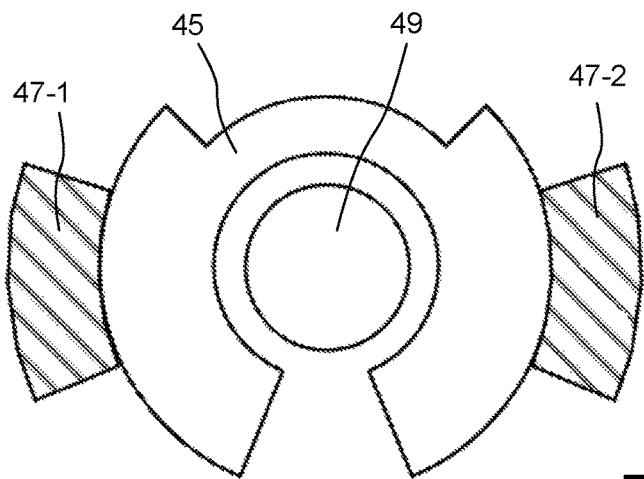
Fig. 2F
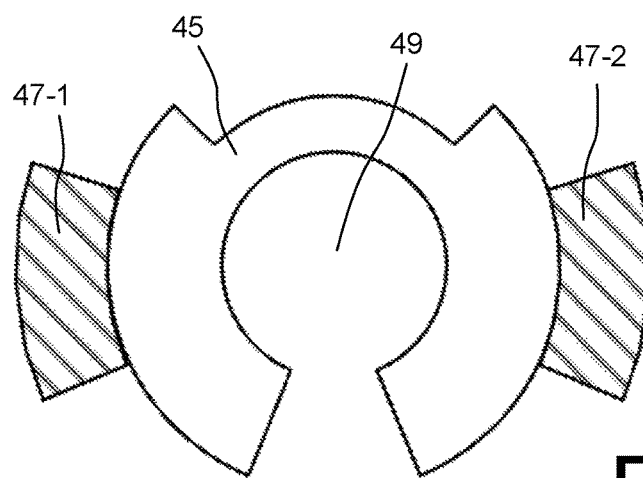
Fig. 2G

DETERMINING OBJECT POSE FROM IMAGE DATA

RELATED APPLICATIONS

The present application is a U.S. National Phase Application under 35 U.S.C. § 371 of International Application No. PCT/GB2020/052052 filed on Aug. 27, 2020, which claims the benefit of United Kingdom (Great Britain) Patent Application No. 1912259.7 filed on Aug. 27, 2019, the entire disclosures of which are expressly incorporated by reference herein.

FIELD OF THE INVENTION

This invention relates generally to an image data processing system, and more particularly to estimation of object pose from captured image data using a trained model.

BACKGROUND

Motion capture (MoCap) is an indispensable tool of many industries, including film, computer games, sport science and bio-mechanics research. Conventional high-performance MoCap systems are designed to capture motion at low latency and high accuracy. For example, traditional motion capture can often use over one hundred infrared cameras at hundreds of frames per second, in order to simultaneously track spherical reflective markers with sub-millimeter error.

However, such conventional systems typically require expensive arrays of specialised cameras, costly software and accessories, and often enormous studio space to accommodate the hardware and associated spatial configurations. Images captured from each camera are first pre-processed and then streamed over a data network to a central server, which computes the 3D world coordinates of each marker by processing the data from all of the cameras, using a triangulation technique. This is computationally intensive, and furthermore the calibration process can become extremely time-consuming as the number of cameras increases.

Furthermore, spherical reflective markers are traditionally used because they are easy to detect and their centres can be accurately and effortlessly located. Such conventional markers have practical limitations. For instance, conventional spherical markers cannot be affixed close to each other, as otherwise the triangulation algorithm at the server might get confused. For this reason, minimum placement distances between markers are typically enforced, resulting in larger spatial configurations that are simply impractical, or at least result in significant limitations in terms of minimum application size and dimensions for certain use cases, such as surgical robotics. Moreover, since markers are generally small, one needs to attach many of them to the tracking subject to completely capture its motion, making the preparation process very time consuming, especially on complex subjects such as human body and face.

Other proposed solutions replace infrared cameras with sensors embedded in body suits. Yet other proposed solutions do away with physical markers altogether and instead utilise computer vision techniques, such as feature extraction for object detection, motion tracking and pose estimation. However, such proposed technologies all suffer perpetual limitations in accuracy, latency and scalability.

What is desired is a practical solution to the above problems that is not bound by hardware limitations.

SUMMARY OF THE INVENTION

Aspects of the present invention are set out in the accompanying claims.

According to one aspect, the present invention provides a marker for affixing to an object to be tracked by an image processing system, the marker comprising a first surface to convey radiation primarily in a first direction, and a second surface to convey radiation primarily in a second direction different to the first direction, whereby the image processing system determines object pose from captured image data of at least a portion of the radiation conveyed from the first and second surfaces of the marker affixed to the object.

The second surface may be provided at a normal direction that is at an angle to the normal direction of the first surface. Each surface may convey a corresponding pattern of radiation. Each surface may comprise a reflective or emitting element, and the corresponding pattern is defined by the geometry of the reflective or emitting element. Each surface may comprise a reflective material, and the corresponding pattern may be defined by the geometry of the surface. The first surface may have a larger salient surface area than the second surface. Therefore, each salient element may comprise a material to convey or reflect radiation from the surface.

The marker may further comprise one or more additional surfaces, each with respective normal in a different direction, and/or one or more source devices to emit radiation from the respective surface. The additional surfaces and/or source devices may be associated with a detectable trigger, switch, or event.

The radiation may be non-visible light, such as infrared radiation (IR), ultraviolet (UV) light, or non-visible laser light. At least one surface may be planar, and/or comprise a deformable material.

In another aspect, the present invention provides a method for determining pose using a trained neural network, by receiving, by a user device, image data of a marker affixed to an object to be tracked, such as the marker described above; providing, to a neural network stored on the user device, a set of input data derived from the image data; generating, based on output of the neural network produced in response to receiving the set of input data, a pose descriptor indicative of estimated pose of the marker; and providing an output by the user device based on the estimated pose of the marker. The output from the neural network may be estimated transformation values relative to a base model of the marker. The neural network may further output data identifying one of a plurality of states of the marker.

The image data may be received from a radiation sensor of the user device. One or more sources of the user device may be configured to emit radiation towards the marker, wherein the radiation sensor receives radiation from one or more reflective surfaces of the marker. Alternatively, the marker may contain its own radiation source illuminating the primary and secondary patterns. The reflected or emitted radiation may be filtered using a filter of the user device provided between the marker and the radiation sensor.

The output provided by the user device may be a rendered image of a 3D model of the object at the determined orientation and position, and/or a captured motion data point of the object in a motion capture system.

In yet another aspect, the present invention provides a method for generating simulated training data for training a neural network, where a plurality of computer-rendered images of a 3D model of a marker object are generated at respective corresponding poses in a 3D coordinate space; and the generated images and corresponding 3D descriptors are provided as input to train a neural network model. The output of the trained neural network model is an estimated pose of a marker object in an input image.

The pose in 3D coordinate space may be defined as translation and rotation values relative to a base model of the marker object. A plurality of computer-rendered images of 3D models of a plurality of different marker objects may be generated and provided as input to train a second neural network model to determine a plurality of classes of the different marker objects. A marker may be associated with a plurality of states, each represented by a respective detectable class.

In other aspects, there are provided apparatus and systems configured to perform the methods as described above. In a further aspect, there is provided a computer program comprising machine readable instructions arranged to cause a programmable device to carry out any one of the methods as described above.

BRIEF DESCRIPTION OF THE DRAWINGS

There now follows, by way of example only, a detailed description of embodiments of the present invention, with references to the figures identified below.

DESCRIPTION OF EMBODIMENTS

Embodiments of the invention will now be described in which a motion capture system provides a pose determination model, which is a model based on a neural network, to a user device. The pose determination model is trained, prior to installation on the user device, based on training data that includes (i) simulated image data of one or more specific marker objects and (ii) associated pose data indicating transformation parameters corresponding to the relative translation and rotation of the or each marker object in a simulated image. Once installed on the user device, the pose determination model may be used to determine the pose of an object in the real world from captured image data of a corresponding physical marker affixed to the object. While the user device may obtain image data of a marker affixed to any type of object and at any scale and orientation to track the object, the model itself does not need to be trained based on all possible scales and orientations of the marker to be tracked by the user device.

Figure 1:
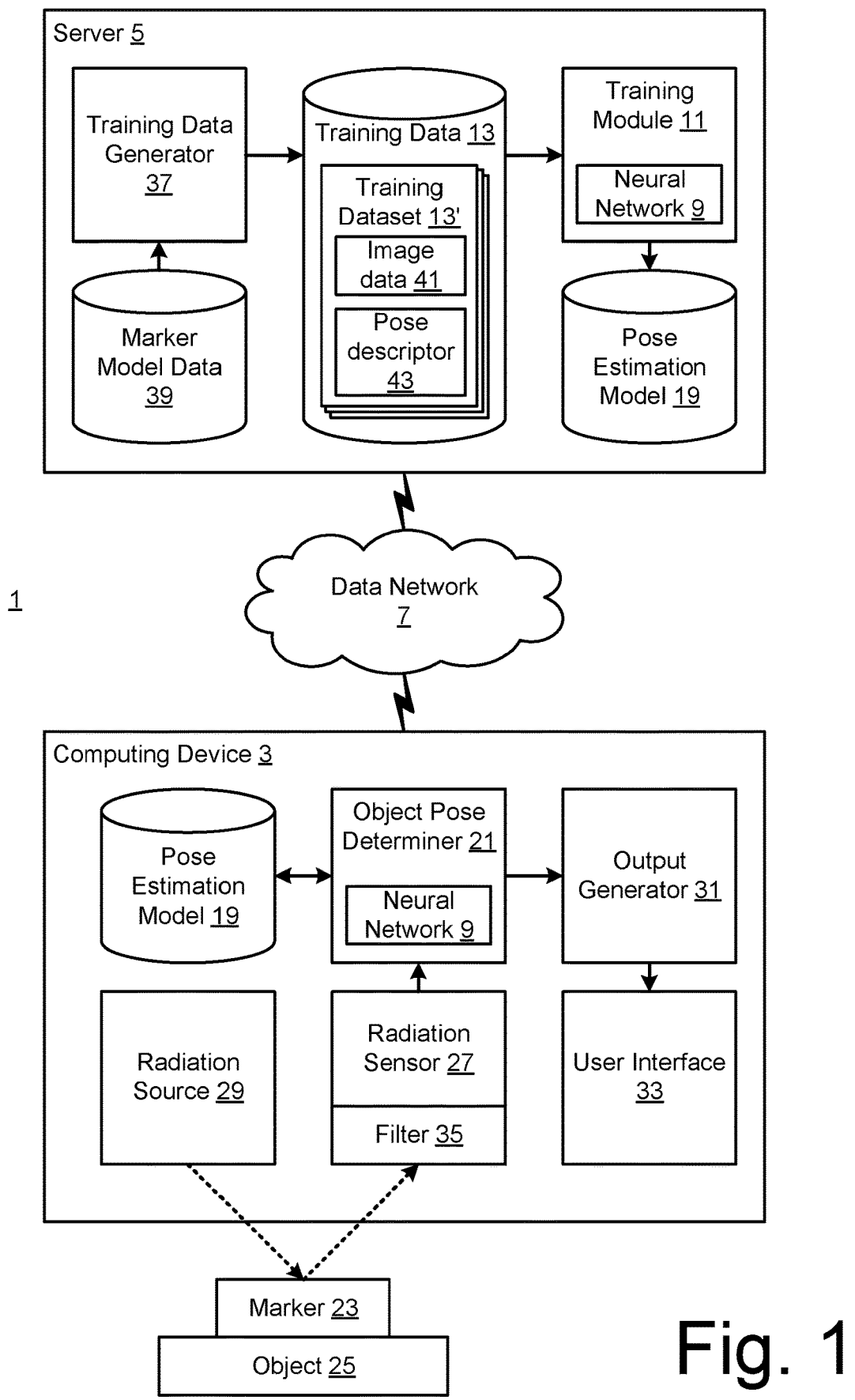
FIG. 1 is a block diagram showing the main components of an object tracking system according to embodiments of the invention.
Figure 2:
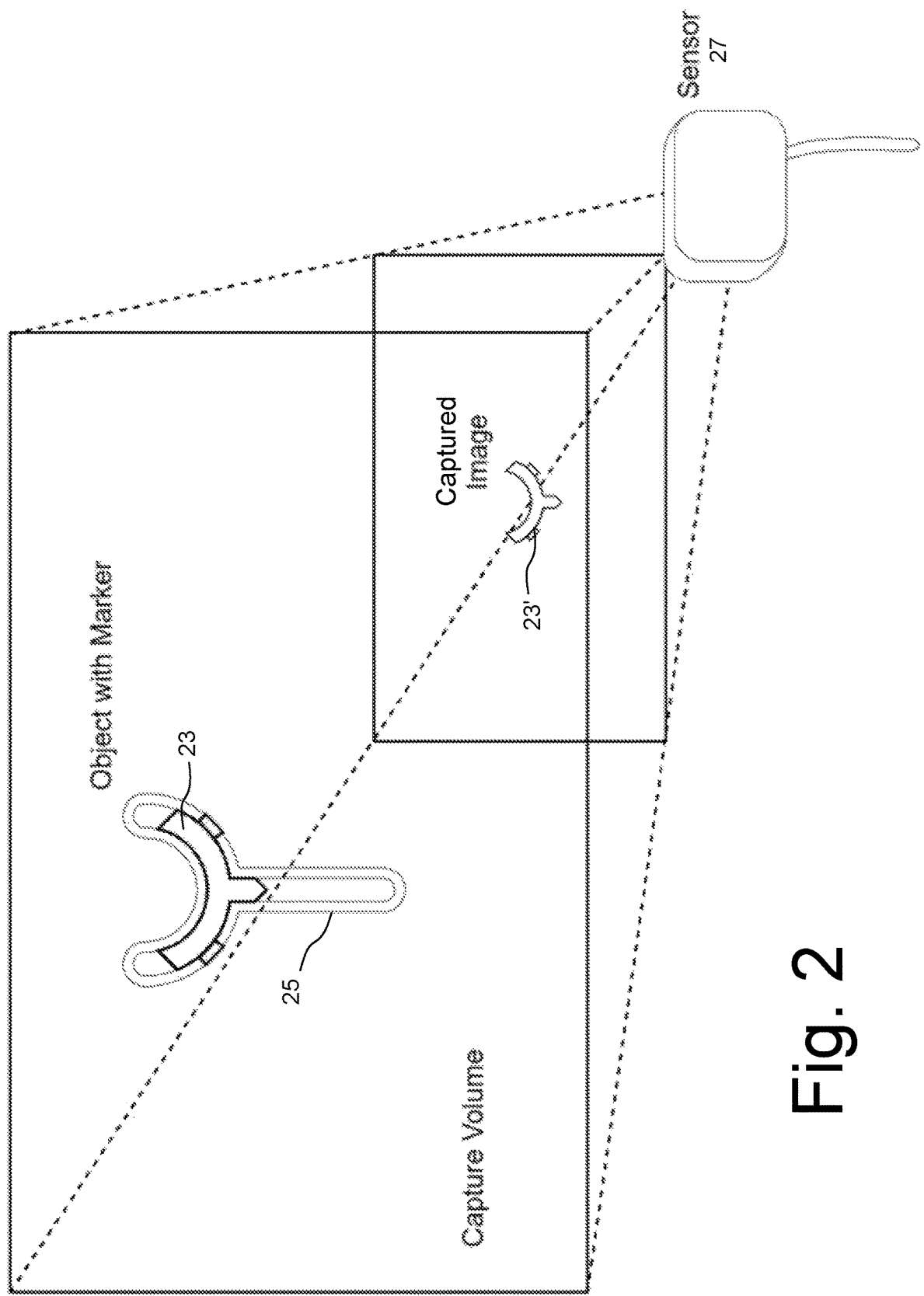
FIG. 2, which comprises FIGS. 2A to 2G, schematically illustrates examples of marker objects according to other embodiments.
Figure 2A:
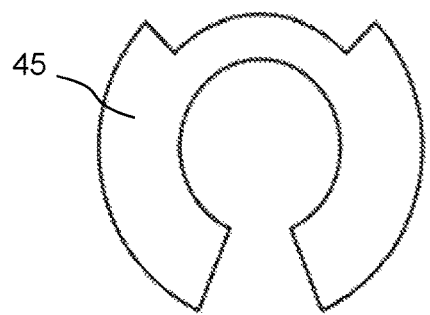

FIG. 1 is a block flow diagram schematically illustrating an example of an object tracking system 1 for using a pose determination model to predict pose of a marker in a captured image frame. Reference is also made to FIG. 2, which schematically illustrates an example of a marker affixed to an object to be tracked that is tracked within the capture volume of a sensor, where image data of the salient features of the marker is captured by the sensor. The system 1 includes a computing device 3 in communication with a server 5 via a data network 7. The server 5 stores a neural network 9 that has been trained by a training module 11 using training data 13 including image data 41 representing marker samples in different poses and/or sizes 43, different shapes, or both. The server 5 generates a pose estimation model 19 based on the neural network 9. A copy of the pose estimation model 19 is then transmitted to the computing device 3 via the data network 5 and stored on the computing device 3.

In the present exemplary embodiment, an object pose determiner module 21 of the computing device 3 performs pose detection and tracking of a marker 23 affixed to an object to be tracked 25. A radiation sensor 27 of the computing device 3 is used to capture image data of salient features of the marker 23, which is provided as input to the pose estimation model 19 of the trained neural network 9. In one example implementation, the radiation sensor 27 is a sensor configured to capture radiation at wavelengths in the implemented spectrums. Alternatively, the radiation sensor 27 may be one or more sensors or cameras to capture salient features of the marker 23 as an output in form of a heat image, depth map, saliency map, ultrasound scan, MRI scan, CT scan, or the like.

The marker 23 exhibits a specific geometry, which is learned by the neural network 9. Surfaces of the marker 23 may be formed with, and/or include, a material to convey radiation towards the radiation sensor 27. In one example implementation, the radiation conveyed from the surfaces of the marker 23 is reflected radiation emitted by a discrete radiation source 29 (and/or a natural source of radiation such as the sun). Such a marker may be referred to as a passive marker, where radiation is reflected in a specific pattern according to the shape and size of the reflecting surface of the marker 23, or a reflective pattern supported on the surface of the marker 23. Alternatively, the marker 23 may include a radiation source to emit radiation in a particular pattern that is captured by the radiation sensor 27. Such a marker may be referred to as an active marker, where detectable radiation is emitted therefrom. The pattern of reflected and/or emitted radiation is captured by the radiation sensor 27 of the computing device 3 and processed by the object pose determiner 21 using the trained pose estimation model 19.

The marker 23 itself may be formed of a flexible/deformable material, allowing the surfaces of the marker 23 to deform according to the surface of an object to which the marker is affixed. As those skilled in the art will appreciate, the trained neural network 9 will account for a certain amount of distortion in the marker patterns in the captured image data.

The pose estimation model 19 stored on the computing device 3 provides an indication of the predicted pose of a marker 25 directly from a single input source image representing captured patterns of radiation received from the marker 23. In one implementation, for example, the output may be a pose descriptor of the marker, including parameters representing transformation values relative to a base marker model. Advantageously, the pose estimation model 19 allows the object pose determiner 21 to implement accurate and efficient object detection and tracking using a single camera. The generated object pose descriptor is indicative of an estimated pose of the marker, and consequently the object to which the marker is affixed. The object pose descriptor may include values representative of position, orientation and scale of the marker object 23 detected in the captured source image.

The object pose descriptor may be provided by the object pose determiner 21 to an output generator module 31 of the computing device 3. For example, the output generator 31 may be configured to generate rendered image data from a 3D model of the marker 39 at a position, orientation and scale determined from the object pose descriptor, for display on a user interface 33. As another example, the output generator 31 may be configured to store the object pose descriptor as an instance of captured motion data in a generated sequence of a motion capture session.

The radiation sensor 27 and radiation source 29 may be provided as integrated components of the computing device 3, or as one or more external devices communicatively coupled to the computing device 3. In the present exemplary embodiment, the object tracking system 1 implements one or more predefined spectrums of electromagnetic radiation. Preferably, although not essentially, the implemented spectrum of radiation includes the wavelengths of non-visible light, such as infrared radiation (IR), ultraviolet (UV) light, non-visible laser light. As those skilled in the art will appreciate, any wavelength can be implemented between the radiation sensor 27, filter 35 and marker 23, as long as the sensor 27 captures image data that represents the trackable marker pattern distinctly and discriminately against background radiation and/or other light sources.

The radiation source 29 may be configured to emit radiation in a primary direction towards the same focal point as the radiation sensor 27. In this way, the radiation source 29 illuminates the same volume of space as the radiation sensor 27 is able to capture, referred to as the tracking volume. As one example, a ring of IR LEDs may be provided around a radiation sensor 27, to minimise the distance between the radiation sensor 27 and the radiation sources, and maximise the tracking volume. A number of different configuration variations in terms of radiation source size, brightness, voltage and illumination beam angle are possible, in order to provide sufficient lighting of the trackable area. For example, a smaller number of high-powered LEDs with high illumination beam angle may produce similar illumination of the tracking volume as a greater number of lower powered LEDs mounted at offsetting angles corresponding to their illumination beam angles.

As those skilled in the art will appreciate, the surfaces of a reflective marker 23 may be adapted to reflect the radiation emitted by the radiation source 29 either discriminatingly, where the marker reflects only the radiation from the radiation source, or inclusively, where the marker reflects the source radiation along with other light/radiation coming from other sources. Optionally, a wavelength filter 35 may be provided between the marker 23 and the radiation sensor 27, to filter out wavelengths outside of the implemented spectrum(s). For example, an IR or UV filter may be provided to let IR or UV light, respectively, through to the sensor 27. Advantageously, using a wavelength filter 35 as a radiation discriminator allows optimal capture by the radiation sensor 27 of radiation in the implemented spectrum that is reflected or emitted from the marker 23, or at least to significantly reduce all other radiation outside the implemented spectrum. In this way, the radiation sensor 27 is able to output image data highlighting salient marker surfaces that is optimised for input to the trained pose estimation model 19.

In another example implementation, the radiation sensor 27 and radiation source 29 may be implemented as a high resolution Lidar sub-system, where a laser sensor sweep is used to measure distance to the marker 23 by illuminating the marker 23 with laser light and measuring the reflected light with the sensor 27. The Lidar sub-system generates digital 3D representations of the marker 23 based on computed differences in laser return times and wavelengths. In such an implementation, salient features of the markers 23 may be provided by distinctly indenting patterns into the, or each, surface of a 3D marker. The Lidar sub-system will detect the indented patterns may perform data processing to discriminate between the detected patterns and the background, to generate the output image data that is input to the trained neural network 9.

Preferably, but not essentially, the field of view (FOV) angle of the radiation sensor 27 may be around 130 degrees as an optimal balance between high tracking volume and precision, although it is appreciated that any FOV may be used. Also preferably but not essentially, a minimum sensor resolution may be 640×480 pixels and a minimum frame rate may be 60 frames per second for effective tracking accuracy.

According to another embodiment, the server 5 includes a training data generator 37 to generate the training data 13 that is used by the training module 11 to train the neural network 9. For example, the training data generator 37 may generate a set of photorealistic images of a specific marker 23 at respective different poses, using stored marker model data 39, such as a 3D CAD model of the marker 23 and associated texture images. The training data generator 37 stores the simulated image data 41 with associated pose descriptors 43 identifying parameters of the respective pose of the 3D marker model in the rendered image, as an instance of a training dataset 13'. As will be described in detail below, the parameters of the pose descriptors 43 may be defined as a projection matrix A and a scale s, based on computed or estimated transformation of a template model.

It should be appreciated that the neural network module 9, the training module 11, the object pose determiner module 21 and/or the training data generator 37 may be combined into a single module or divided into additional modules, which may be provided as one or more distributed computing modules or processing services on a remote server that is in communication with the system 1 via the data network 7. Additionally, as those skilled in the art will appreciate, the training module 11 and/or object pose determiner module 21 functionality may be provided as one or more application programming interfaces (APIs) accessible by an application program executing on the server 3 and computing device 3, or as a plug-in module, extension, embedded code, etc., configured to communicate with an application program. The system 1 may also include other components, sub-components, modules, and devices commonly found in a computing system/device, which are not illustrated in FIG. 1 for clarity of the description.

FIG. 2, which comprises FIGS. 2A to 2G, schematically illustrates examples of a marker object 23 according to various embodiments. As shown, each marker 23 may include one or more distinct surfaces and/or patterns that each convey radiation, for example as reflected from a discrete radiation source 29. The example shown in FIG. 2A includes a single planar surface. In the example implementation of a passive marker, the surface of the marker 23, which is exposed when the marker is affixed to the object 25 to be tracked, is formed with a material to reflect radiation emitted by a discrete radiation source 29 according to the implemented spectrum. Preferably, the reflective material reflects the source radiation in various degrees, in addition to the specular or regular mirror-like reflection, to improve the likelihood that sufficient radiation is reflected towards the radiation sensor 27 so that image data of the salient features of the captured marker can be segmented from the background. For example, the surface of the marker 23 may include a reflective pattern 45 formed from tape or sticker of a reflective material, also referred to as "high-vis" material, which can have a reflection illumination beam angle of approximately 100 degrees.

Figure 2B:
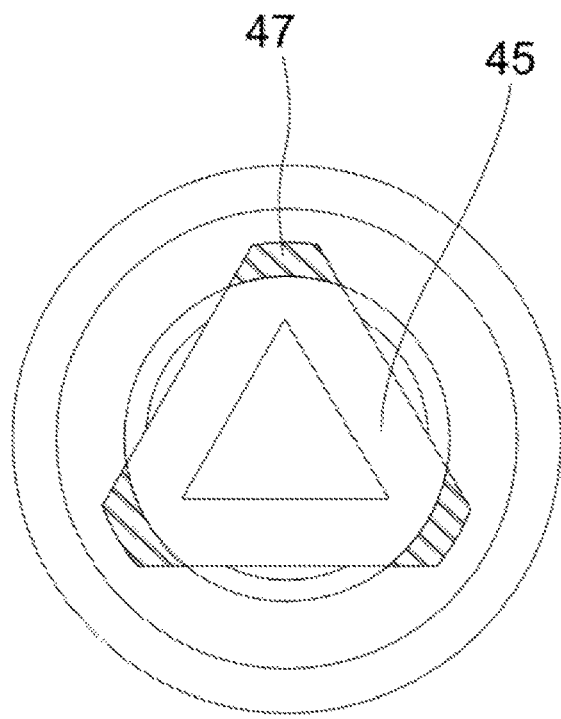
Figure 2C:
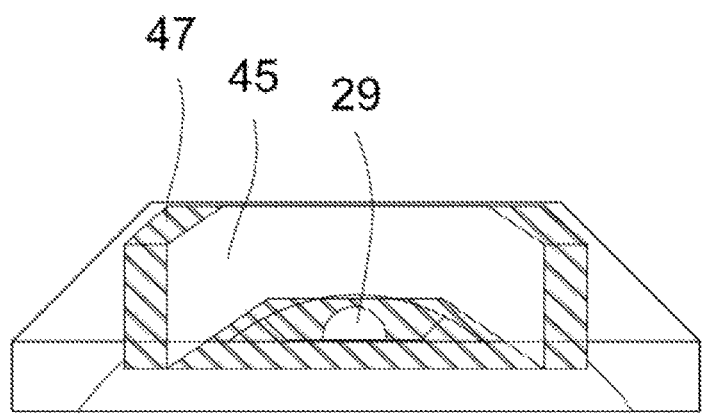

Alternatively or additionally, the surface of the marker itself may define the detectable pattern 45 for example by being formed of, and/or coated with, a reflective material. In the example implementation of an active marker, the surface of a non-reflective marker may be illuminated by an internal radiation source, which is detectable by a radiation sensor 27. FIGS. 2B and 2C illustrate one such exemplary active marker 23, in which the surfaces of the marker do not reflect radiation but instead, the marker 23 is provided with one or more radiation sources 29' that is built in and emits radiation from within the marker itself. As shown, the internal radiation source(s) 29' may illuminate primary 45 and stabilising 47 patterns from within, the patterns formed by respective primary and secondary surfaces of a light diffuser fitted into the corresponding receiving structure of a housing of the active marker 23. The light diffuser may be a semi-transparent piece of plastic, which is illuminated by the radiation source 29' located beneath the surface of the diffuser. It will be appreciated that the image data of salient features of the marker 23 represented by the illuminated diffuser together with the rest of the marker, as captured by the radiation sensor 27, will have the same appearance as captured image data of a reflective version of the same salient features of a passive marker. It is appreciated that a wider reflection or illumination beam angle provides improved results, advantageously providing the effect of uniformly reflected radiation, so that the, or each, component of a marker 23 is clearly captured by the radiation sensor 27 with consistent brightness/radiance per square mm for example.

FIGS. 2D and 2E show examples of another marker 23 that includes one or more secondary surfaces, according to another embodiment. It will be appreciated that each of the primary and secondary surfaces may be provided as distinct surfaces, detectable by the object tracking system 1 as separate portions of the marker 23. As shown, the secondary surfaces provide, or support, additional stabilising patterns 47 that are used to reduce ambiguity in the trained pose estimation model 19. Detection and tracking accuracy is improved as relative complexity of the marker patterns increases. The stabilising patterns 47 advantageously improve the trackability and accuracy especially in 3D space. In the examples shown in FIG. 2, the primary pattern 45 represents the largest proportion of the marker 23 and is bigger than the other secondary patterns. In the illustrated examples, the stabilising patterns 47 are arranged adjoining the primary patterns 45 at its exterior walls but this is not necessary and the stabilising patterns 47 may be provided as distinct components set apart from the primary pattern 45.

FIG. 2F shows another example of a marker according to another embodiment. As shown, the marker in this embodiment, referred to as an HCI marker, includes one or more additional components or patterned regions 49 each associated with a respective switch or state modifier, where a user may deliberately move or change the marker components in a detectable manner. The switch components 49 provide user input interface elements to the marker 23, for interaction between the user and the device 3. The, or each, switch component 49 may also be formed of a reflective material, and may have any shape or size. As shown, the exemplary HCI marker 23 has a central circular region 49 defining an on-off switch component. The user may temporarily conceal the switch component, for example using his or her finger, to prevent emission of radiation from the covered portion as shown in FIG. 2G. A combination of passive and/or active marker components may be included. Each component may be configured to act as a switch or variable modifier, for example by wholly or partially hiding and revealing a salient pattern, changing an arrangement or shape of a salient pattern, changing the illumination or reflectivity properties of a salient pattern, changing the relative angle of a salient pattern, etc. In such an implementation, the neural network 9 will be trained using images of the HCI marker in each of the different operational states, whereby the trained neural network 9 can identify and distinguish between input states of the switch or variable modifier. In this way, any marker may be used as a Human Computer Interface (HCI) device, which is deliberately used for human-computer interaction, rather than mere tracking of an object. Such an HCI marker or device may be active or passive, or a combination of both, and feature any number of active or passive switches or variable modifiers.

Alternatively or additionally, the switch component 49 may comprise a distinct radiation source 29', such as an IR LED that emits IR radiation at a particular wavelength or range of wavelengths. A wide illumination beam angle by this radiation source 29' improves the likelihood that sufficient radiation is directed towards the radiation sensor 27 so that image data of the captured marker includes the switch component. As a further possible modification, the IR LED may be provided with a diffuser that is configurable to adjust brightness of the emitted IR radiation, for example in accordance with a variable modifier associated with user input via a separate input means of the marker, such as a physical button with force sensing. The associated 3D model 39 in the marker model data 39 may include data defining the modifiable element, allowing the training data generator 37 to systematically change the size, shape or other recognisable configuration of the switch component in the simulated training data 13, thereby training the neural network 9 to detect a variable modifier of the marker 23. The combinations of primary, stabilising and switch patterned components advantageously provide for highly flexible design freedom and utility of the markers for object tracking.

Figure 3A:
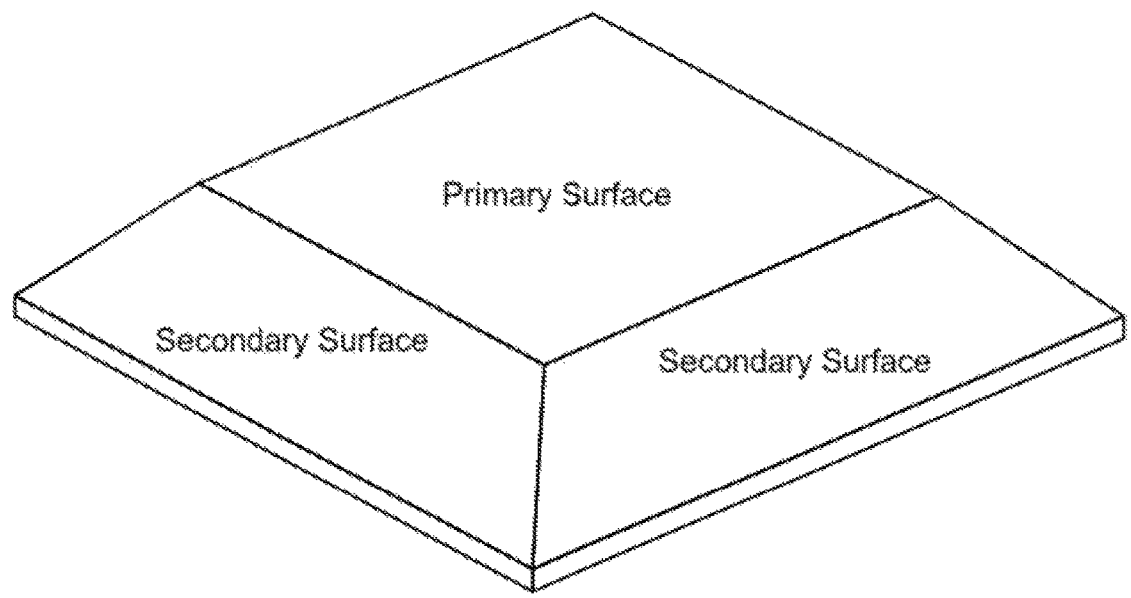
FIG. 3, which comprises FIGS. 3A and 3B, schematically illustrates further examples of a marker object according to another embodiment.

Preferably, but not essentially, each stabilising pattern is supported on a respective secondary surface, which is angled against the primary pattern surface to form a 3D marker. FIG. 3A schematically illustrates a simplified carrier geometry of one such 3D marker 23, according to another embodiment. As shown, the 3D marker 23 in this exemplary embodiment includes a primary surface to reflect or emit radiation in a first direction, and a plurality of secondary surfaces arranged at respective angles relative to the primary surface, to reflect or emit radiation in respective directions that are each different to the first direction. Respective stabilising patterns can be placed and supported by each of the secondary surfaces, such that the secondary patterns are not co-planar with a primary pattern on the primary surface. The primary and secondary surfaces may each be formed of a reflective material and/or carry one or more reflective patterns. As those skilled in the art will appreciate, each surface of the marker can have any shape and geometry. It will be appreciated that each of the primary and secondary surfaces are provided as distinct surfaces, detectable by the object tracking system 1 as separate portions of the 3D marker 23.

Figure 3B:
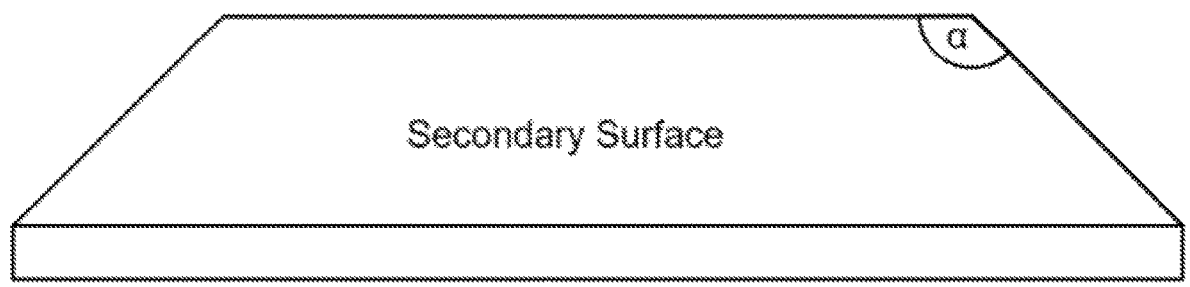
Figure 4A:
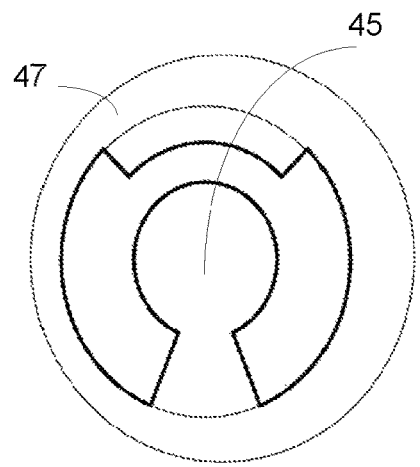
FIG. 4, which comprises FIGS. 4A to 4D, schematically illustrates further examples of marker objects according to other embodiments.
Figures 4B, 4C:
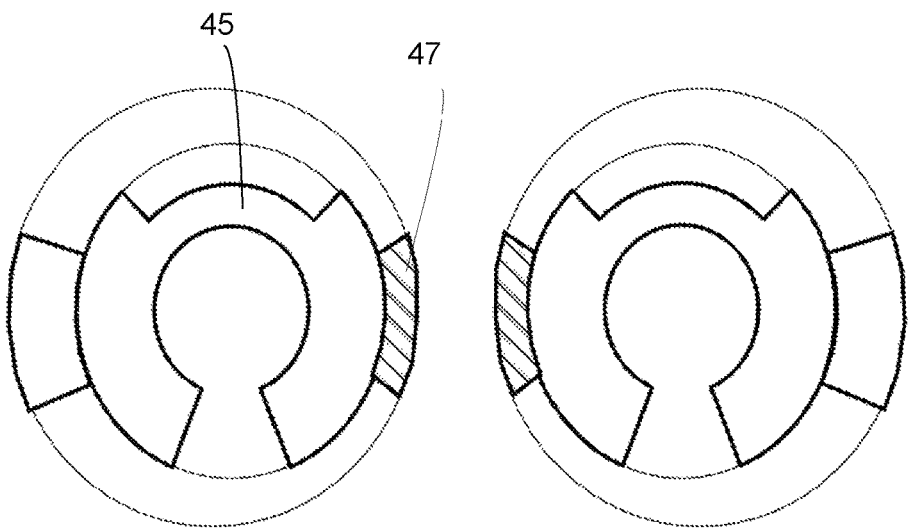
Figure 4D:
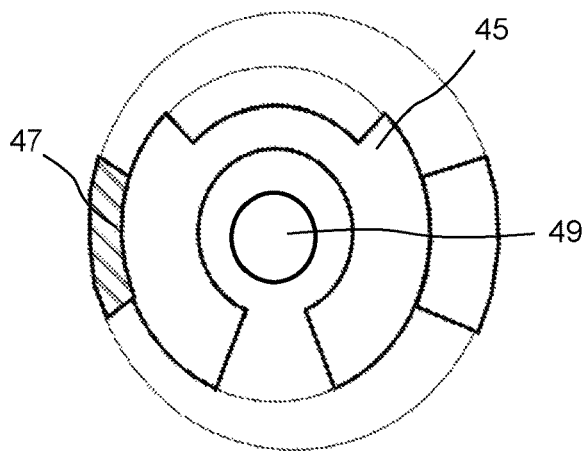

As shown in FIG. 3B, the exemplary 3D marker has a 135 degree angle between the normal direction of the primary surface and the normal direction of the supporting surfaces. It is appreciated that other angles, preferably within the range of 95 to 175 degrees, are possible. One or more secondary surfaces may each be arranged at different angles relative to the primary surface. Optionally, primary and supporting surfaces do not need to be flat and can be curved as long as the surfaces' tangents are not parallel. The primary surface may have a larger surface area than the secondary surface(s) as shown in FIG. 3A, but this is not necessary. The marker 23 may include multiple parallel primary surface areas and/or patterns. FIGS. 4A to 4D schematically illustrate further examples of 3D markers 23 according to other embodiments. As shown, the salient features of the exemplary markers correspond to the exemplary markers shown in FIGS. 2A and 2D to 2F, respectively.

The associated marker model data 39 includes a 3D model defining the primary and secondary surfaces and/or patterns, including the relative angles therebetween, whereby the specific salient properties of the marker are learned by the trained neural network 9 for subsequent detection and pose estimation. The object pose determiner 21 of the computing device 3 determines object pose of the 3D marker from captured image data of at least a portion of the radiation received from the first and/or the second surface of the 3D marker 23 affixed to an object to be tracked. Advantageously, the 3D geometric structure of the marker 23 in this embodiment allows for substantially better tracking and interactivity, especially within the 3D space. More particularly, the angled stabiliser improves the amount of radiation that is reflected or emitted in the direction of the camera.

Figure 5:
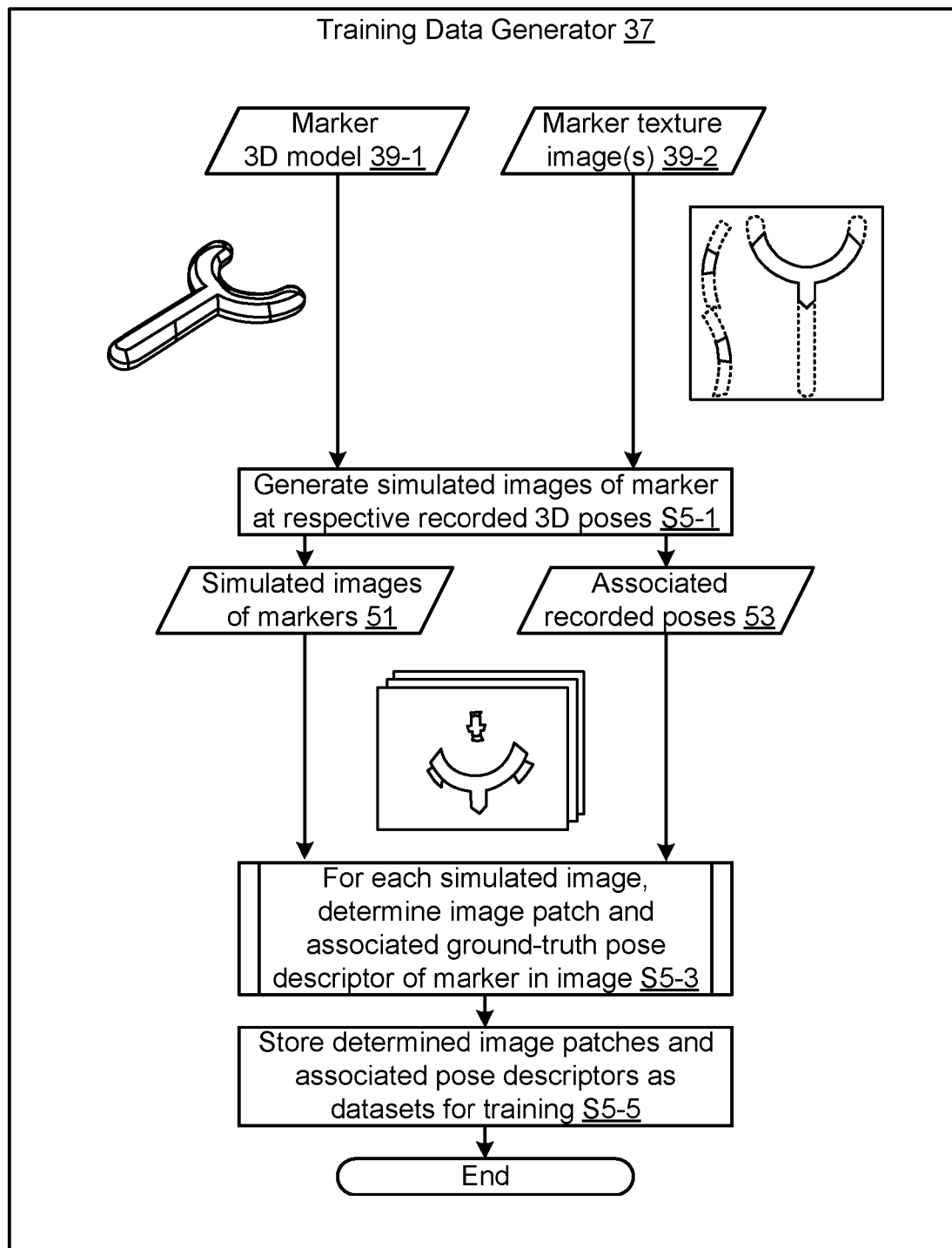
FIGS. 5 and 6 are block flow diagrams illustrating the main processing steps performed by a training data generator module in the system of FIG. 1, according to an embodiment.

FIG. 5 is a block flow diagram illustrating main data elements and processing steps of the training data generator 37 to generate datasets for training of the neural network model, according to another exemplary embodiment. As shown, the training data generator 37 generates simulated images of a marker at respective recorded 3D poses, at step S5-1. For example, the training data generator 37 may retrieve marker model data 39 including a 3D CAD model 39-1 of the marker and associated texture images 39-2, to generate a set of photorealistic images 51 of the marker at respective different poses, with respective recorded pose data 53 identifying 3D pose parameters of the CAD model 39-1 in the respective simulated rendered image 51. For example, each recorded pose 53 may be defined as a vector, $l=[x, y, z, r_x, r_y, r_z]$, where x, y and z are positions and $r_x$, $r_y$, $r_z$ are Euler angles, according to the six degrees of freedom (6DoF) in 3D space. Preferably, but not necessarily, the rendered images 51 may be greyscale images using a static lighting configuration, to reduce processing complexities. The results of this phase may be a set of greyscale simulated images 51, denoted as $T=\{Id_i\}_1^N$, $I \in R^{W \times H}$, and a set of 3D labels 53, $L=\{l_i\}_1^N$, $l_i \in R^6$, where N is the number of data points, W, H are image width and height. Advantageously, a substantial number of training data instances, for example N=250,000 per marker with image shape W=800, H=600, may be generated for input to the training module 11, which would otherwise be impractical and error-prone, using a database of training images of a physical marker.

Figure 6:
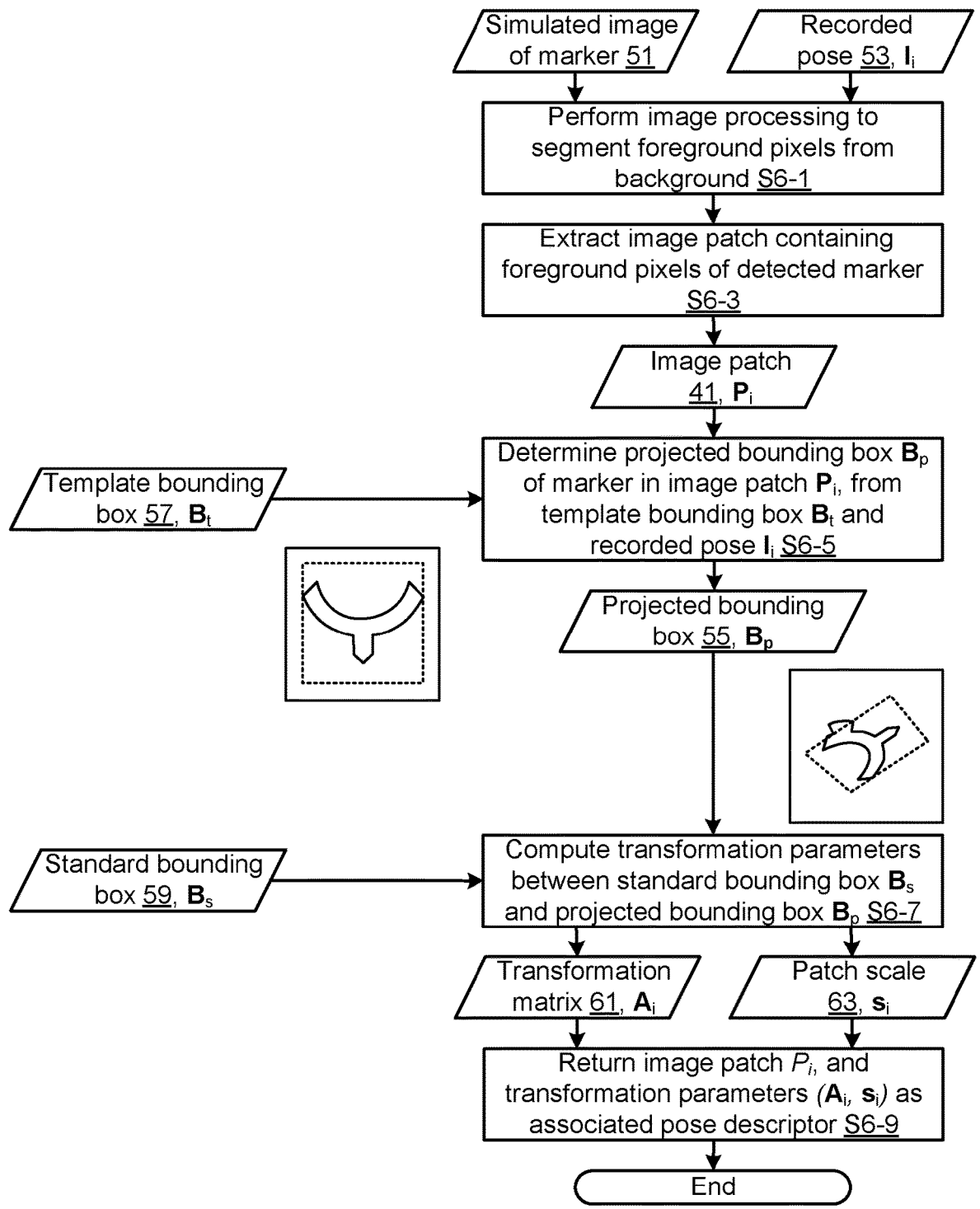

For each simulated image and associated recorded pose, the training data generator 37 determines an image patch and associated ground-truth 3D pose descriptor of the marker in the simulated image, at step S5-3. FIG. 6 is a block flow diagram illustrating in greater detail an exemplary process of determining an image patch 41 and associated pose descriptor 43 of the marker 23 in a simulated image 51, according to one embodiment. As shown, the training data generator 37 performs image processing to segment foreground pixels from background pixels in the simulated image, at step S6-1.

At step S6-3, the training data generator 37 extracts an image patch 41 containing foreground pixels of the marker 23 detected in the simulated image 51. The image patches 41 may be a predefined and uniform size for improved neural network performance, such as 60 by 60 pixels. For example, the foreground pixels represent values of radiation received from the salient surfaces and/or patterns of the marker 23. At step S6-5, the training data generator 37 determines a projected bounding box 55, $B_p$, of the detected marker 23 in the image patch 41, $P_i$, from a template bounding box 57, $B_t$, and the associated recorded pose 53, $I_i$. In the illustrated examples, the bounding boxes for a marker are defined by specifying four vertices lying on the same surface that contains the marker in 3D space. The vertices may be defined relative to a coordinate system that is local to the marker model data 39. Using the pose labels 53, $I_i$, recorded in the simulation phase, the 2D projection of the template bounding box 55, e.g. $B_p \in R^{4 \times 2}$, on the image plane may be computed as shown in FIG. 6.

At step S6-7, the training data generator 37 computes the set of transformation parameters between a standard bounding box 59, $B_s$, and the projected bounding box 55, $B_p$. The standard bounding box 59 may defined as $B_s=[[-1, -1], [1, -1], [1, 1], [-1, 1]]$, and the transformation may be mathematically defined as:

$$B_p' = A(B_s')^T$$

where ' indicates homogeneous coordinates, T is transpose operator, A is a projection matrix 61, e.g. $A \in R^{3 \times 3}$, defining values to compute the perspective transformation of the standard bounding box 59 to the 2D projected bounding box 55, $B_p$. A patch scale parameter 63 is also computed, for example as a vector $s_i=(s_x, s_y)$, representing the scales of the bounding boxes relative to the width and height of the simulated image 51.

The transformation matrices 61, $A_i$, along with respective patch scale parameters 63, $s_i$, define the pose descriptor 43 associated with the image patch 41 determined at step S6-3. At step S6-9, the training data generator 37 returns the image patch 41, $P_i$, and associated pose descriptor 43, as a generated instance 13' of training data 13. Returning to FIG. 5, at step S5-5, the training data generator 37 stores the determined image patches 41 and associated pose descriptor 43 as datasets 13' for training. Optionally, the pose descriptor 43 may further include respective class labels $c_i$ identifying the associated class of marker 23, for example in a 1-of-K encoding corresponding to the output of a marker classifier layer of the trained neural network 9. For example, each class of a particular marker may represent a respective operational state of a switch or state modifier of that marker.

As used herein, the pose determination model 19 refers to a single model of the neural network 9 that can be used to determine an accurate estimate of the 3D pose of one or more specific marker objects captured in image data. In the exemplary embodiments, the neural network 9 includes a structured arrangement of processing nodes, each node having a corresponding weight parameter. The weight parameters defining the neural network 9 are updated by the training module 11 during a training stage. The training module 11 trains the neural network 9 based on input image data 41 and associated pose descriptor 43, retrieved for example from the training data 13.

The neural network 9 may include one or more input layers for inputting image patches P and associated patch scales s from the training data 13, multiple hidden layers for processing the input data, and an output layer for providing values of a projection matrix A. Each hidden layer may include one or more weights or other parameters. The weights or other parameters of each respective hidden layer may be adjusted so that the trained neural network 9 produces the desired target projection matrix A corresponding to each dataset 13' of training data. The neural network 9 may be trained until the pose estimation model 19 can identify 3D pose parameters of a marker detected from the input image data, with less than a maximum error rate compared to the ground-truth labels generated by the training data generator 37.

Figure 7:
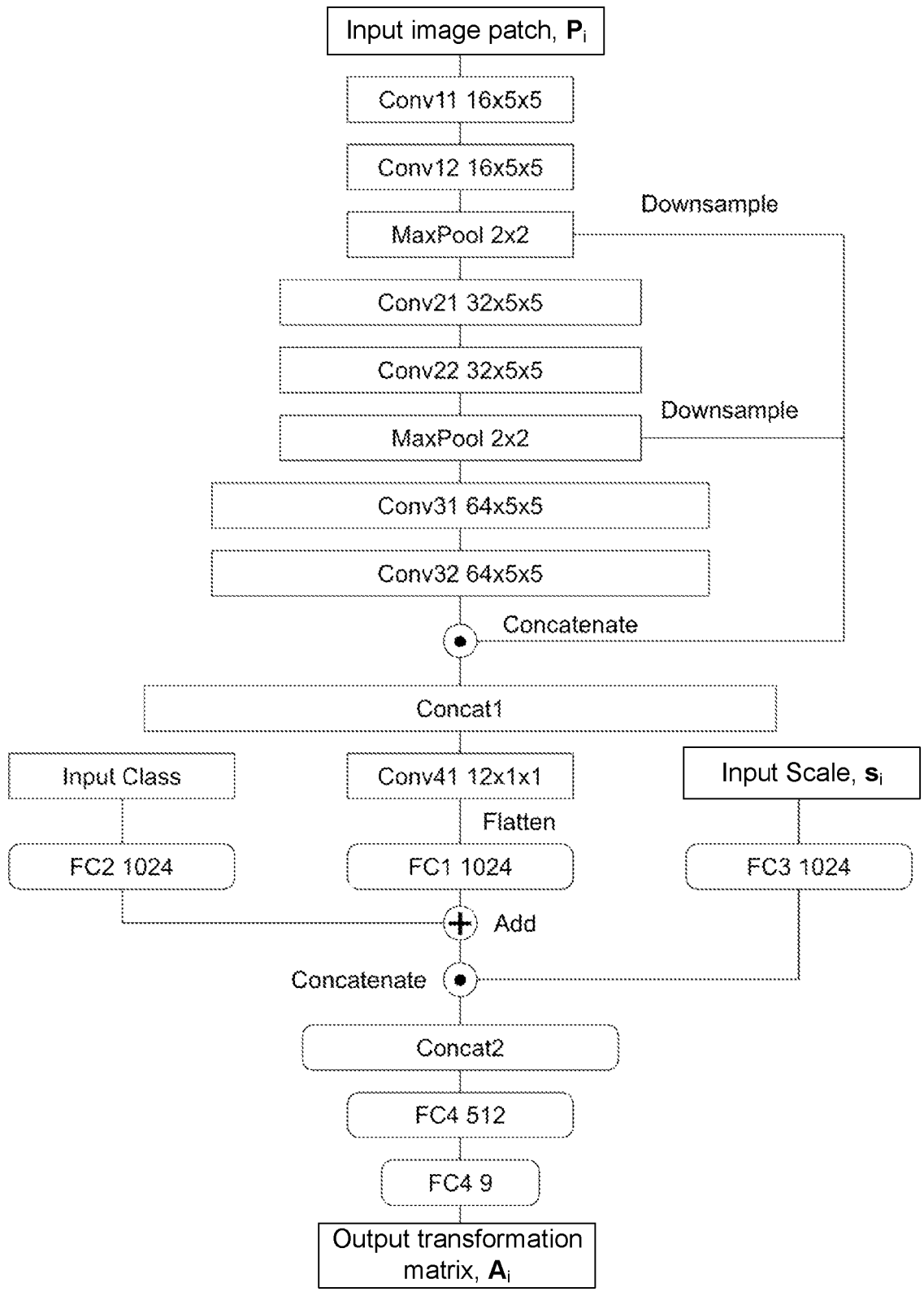
FIGS. 7 and 8 are block flow diagrams schematically illustrating exemplary neural network structures of the pose estimation model.

FIG. 7 is a schematic block flow diagram illustrating a convolutional neural network (CNN) structure that can be trained to output an estimated projection matrix 61 defining values to compute the perspective transformation of a marker detected from input image data relative to a base model of the marker, according to an exemplary embodiment. As shown, the hidden convolutional layers are labelled as [Conv ##] [No. filters×Filter's width×Filter's height]. Fully connected and max-pooling hidden layers are labelled to indicate the respective number of linear parameters and pooling window size. Advantageously, this exemplary structure implements a dilation rate of two in the convolutional layers to improve prediction quality.

Figure 8:
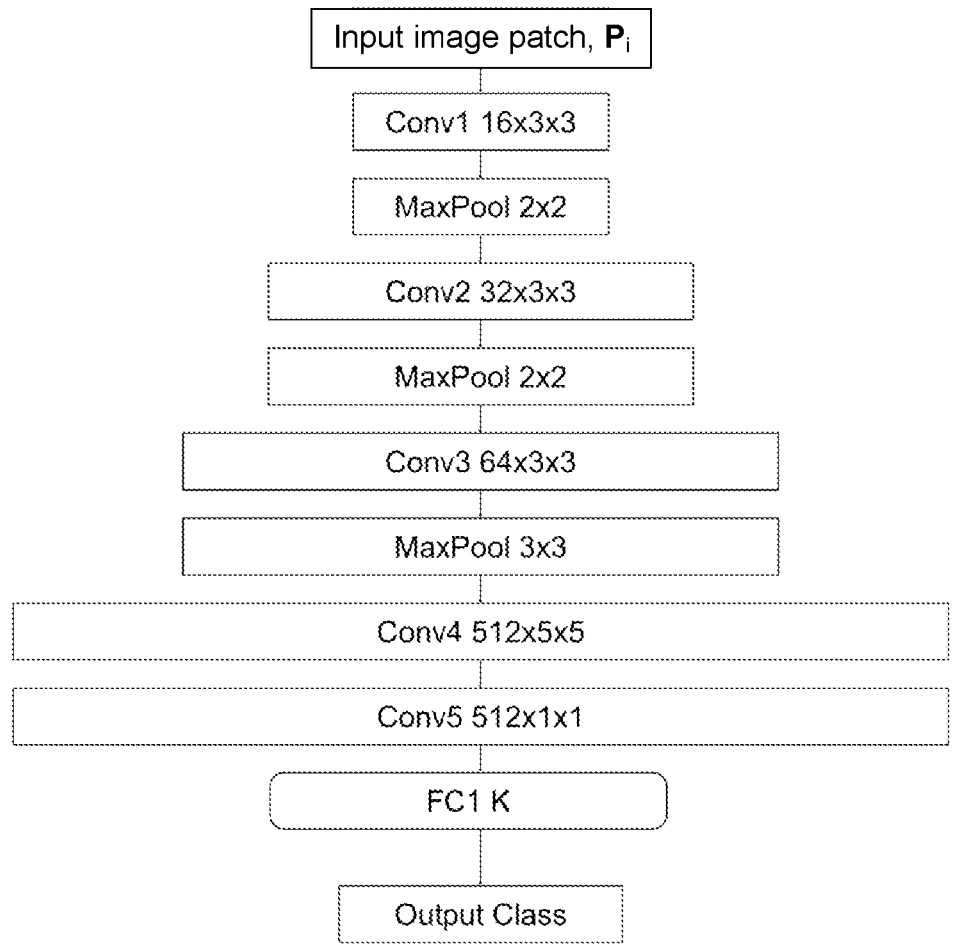

Optionally, the neural network may be trained to determine the type of the detected marker, from a set of trained types, which may be input to a hidden layer of the exemplary neural network structure shown in FIG. 7. FIG. 8 is a schematic block flow diagram illustrating one exemplary neural network structure that can be trained to output a 1-in-K vector identifying the classification of a detected marker in an input image patch. For example, the trained neural network 9 may output an identification of one of a plurality of operational states of the detected marker. The output class may be provided as an input to the FC2 layer of the pose estimation neural network of FIG. 7 that is trained to determine pose of K different classes of markers. In this alternative, the neural network 9 may be further trained until the pose estimation model 19 can distinguish between classes of different markers, with less than a maximum error rate.

The exemplary neural network architectures illustrated in FIGS. 7 and 8 exhibit notable advantageous features. For example, the exemplary neural network 9 is configured to apply large receptive fields on small feature maps, which provides robust spatial estimation as the neural network 9 will be able to detect transformation at global scale. For instance, at layers Conv31 and Conv32, the filters cover ⅔ size of feature maps. Additionally, by merging feature maps from multiple layers with different relative filter sizes, this enables the neural network 9 to memorize pixel displacement at multiple scales. Furthermore, by conditioning the fully connected layers on class labels, this allows a single neural network 9 to recognise and perform pose estimation of multiple marker types. In the illustrated exemplary neural network 9, the total number of learnable parameters of the pose estimate model 19 is approximately 4.5 million, which is considerably smaller than many conventional network architectures and enables the object pose determiner 21 to operate at a high frame rate, achieving rates of above 100 frames per second on common CPUs and GPUs.

Figure 9:
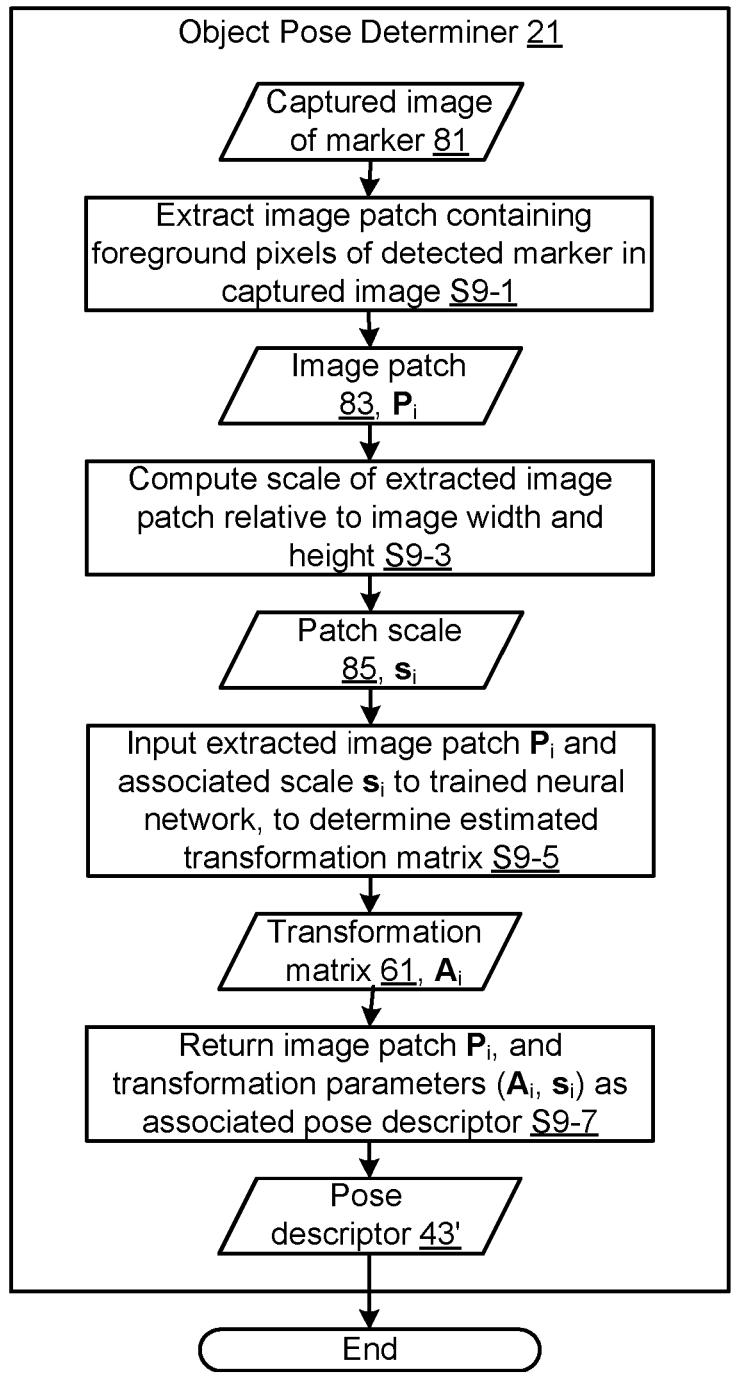
FIG. 9 is a block flow diagram illustrating the main processing steps performed by an object pose determiner module in the system of FIG. 1, according to an embodiment.

FIG. 9 is a block flow diagram illustrating main data elements and processing steps of the object pose determiner 21 to determine estimated pose of a marker from input image data using the trained neural network model, according to another exemplary embodiment. At step S9-1, the object pose determiner 21 receives captured image data 81 of a marker 23 and extracts an image patch 83 containing foreground pixels of the detected marker in the captured image data 81. For example, the captured image data 81 may be received from radiation sensor 27 of the computing device 3, including data values representing captured patterns of radiation received from the salient surfaces and/or patterns of the marker 23.

At inference time, the input image patches 83 may be passed through the same processing pipeline described earlier to obtain patches $P_i$ and patch scales $s_i$. At step S9-3, the object pose determiner 21 calculates the scale, $s_i$, of an extracted image patch 83 relative to the width and height of the captured image 81. At step S9-5, the object pose determiner 21 inputs the extracted image patch 83, $P_i$, and associated scale 85, $s_i$, to the trained neural network 9, to determine an estimated projection matrix 61, $A_i$. For example, the trained neural network 9 may first classify each input image patch 83 into one of the K distinct categories, $c_1$. Then, all input data points may be passed to the exemplary neural network as shown in FIG. 7, to produce the projection matrix $A_i$. The output from the object pose determiner 21 is a pose descriptor 43' representing the estimated pose of the, or each, marker detected in the captured image 81, determined at step S9-7 from the extracted image patch 83, $P_i$, the calculated patch scale 85, $s_i$, and the projection matrix 61, $A_i$, output by the trained neural network 9.

At step S9-7, the object pose determiner 21 may output the determined pose descriptor 43' to the output generator 31 of the computing device. In an exemplary implementation, the output generator 31 of the computing device computes the 3D position (e.g. translation) and rotation parameters of the detected marker 23, based on the pose descriptor 43' output by the trained neural network 9. For example, the output generator 31 may compute a vector of values according to the six degrees of freedom (6DoF) in 3D space, similar to the recorded pose 53, $I_i$. Alternatively, the output generator 31 may compute a 3D pose matrix $M_i \in R^{4\times4}$, based on the projection matrix $A_i$, scale vector $s_i$ and image patch $P_i$ of the pose descriptor 43', for example using a PnP solver as is known in the art to estimate the pose from the plurality of 3D-to-2D point correspondences.

Advantages

A number of additional advantages will be understood from the above description of the embodiments of the present invention.

For example, aspects of the present embodiments advantageously provides for great flexibility in the design and manufacture of markers to be affixed to objects to be tracked, removing rigid restrictions on how markers should be designed and applied, making them highly versatile. While traditional MoCap systems are limited in terms of the minimum dimension of an array of markers which may be triangulated, our minimal marker is considerably smaller. The system can be expanded in number of cameras and can be integrated into existing surveillance systems.

Aspects of the present embodiments also advantageously allow the use of a single camera to capture motion, thus making it easier to setup and operate the MoCap system, as compared to configurations of at least three cameras in conventional systems. This minimal requirement helps reduce the cost of the hardware involved.

Aspects of the present embodiments are further advantageous in providing core processing that is computationally inexpensive and therefore embeddable into any form of computing device, including smart TV, mobile phone and other IoT devices.

Furthermore, by utilising a neural network, the MoCap system of the present embodiments advantageously produces accurate 3D tracking results at excellent latency.

Example Computer System Implementation

Figure 10:
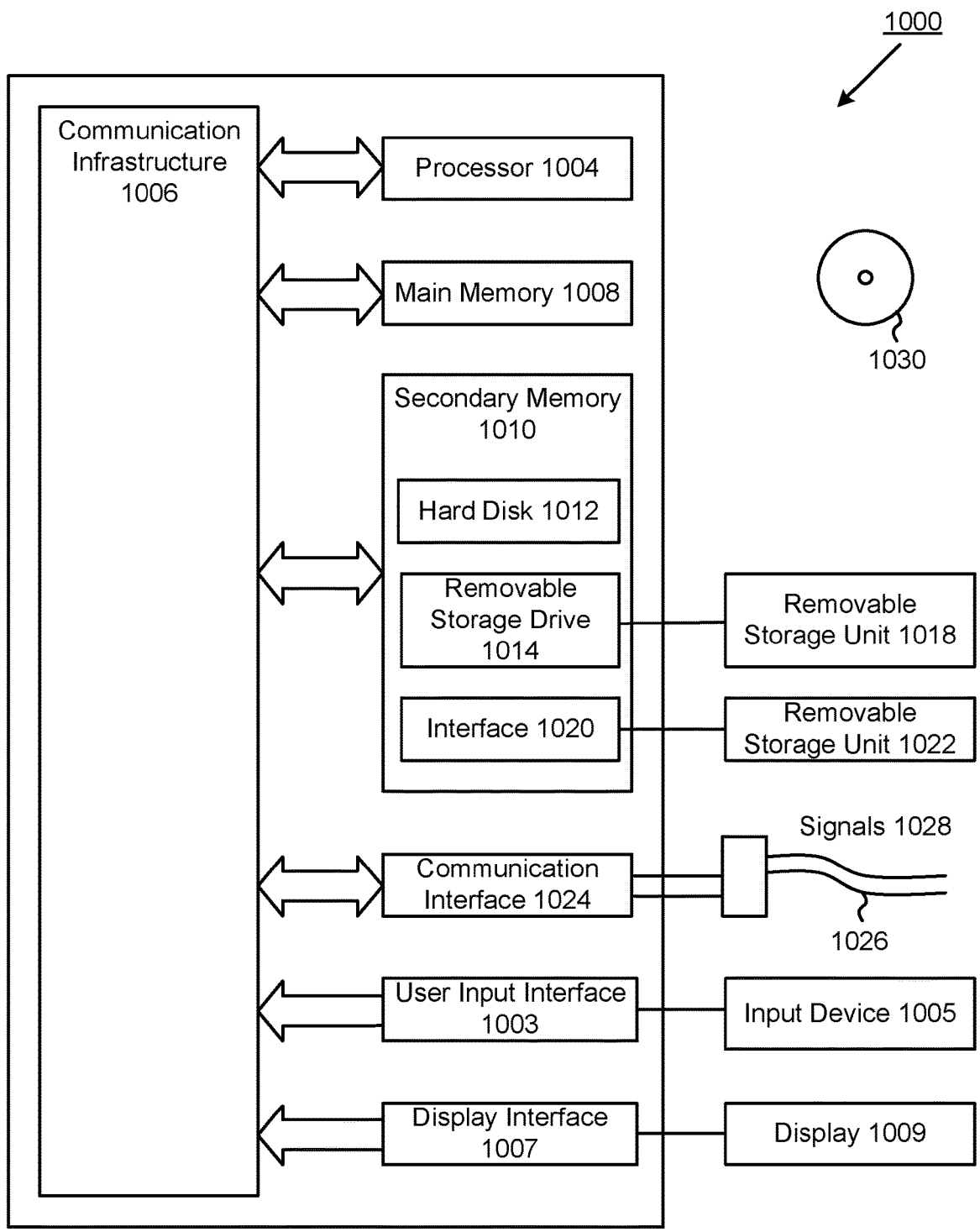
FIG. 10 is a diagram of an example of a computer system on which one or more of the functions of the embodiment may be implemented.

FIG. 10 illustrates an example computer system 1000 in which the present invention, or portions thereof, can be implemented as computer-readable code to program processing components of the computer system 1000. Various embodiments of the invention are described in terms of this example computer system 1000. For example, the computing device 3 and the server 5 of FIG. 1 can each be implemented in such a system 1000. The methods illustrated by the flowcharts of FIGS. 4 to 8 can also be implemented in such a system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general-purpose processor. Processor 1004 is connected to a communication infrastructure 1006 (for example, a bus, or network). Computer system 1000 also includes a user input interface 1003 connected to one or more input device(s) 1005 and a display interface 1007 connected to one or more display(s) 1009, which may be integrated input and display components. Input devices 1005 may include, for example, a pointing device such as a mouse or touchpad, a keyboard, a touchscreen such as a resistive or capacitive touchscreen, etc. According to an embodiment described above, the marker 23 is an exemplary input device 1005. Computer display 1030, in conjunction with display interface 1002, can be used to display the user interface 33 shown in FIG. 1 on the computer display 1030.

Computer system 1000 also includes a main memory 1008, preferably random access memory (RAM), and may also include a secondary memory 1010. Secondary memory 1010 may include, for example, a hard disk drive 1012, a removable storage drive 1014, flash memory, a memory stick, and/or any similar non-volatile storage mechanism. Removable storage drive 1014 may comprise a floppy disk drive, a magnetic tape drive, an optical disk drive, a flash memory, or the like. The removable storage drive 1014 reads from and/or writes to a removable storage unit 1018 in a well-known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a non-transitory computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 1000, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 1018, removable storage unit 1022, and a hard disk installed in hard disk drive 1012. Computer program medium, computer readable storage medium, and computer usable medium can also refer to memories, such as main memory 1008 and secondary memory 1010, which can be memory semiconductors (e.g. DRAMs, etc.). These computer program products are means for providing software to computer system 1000.

Computer programs are stored in main memory 1008 and/or secondary memory 1010. Computer programs may also be received via communications interface 1024. Such computer programs, when executed, enable computer system 1000 to implement the present invention as described herein. In particular, the computer programs, when executed, enable processor 1004 to implement the processes of the present invention, such as the steps in the methods illustrated by the flowcharts of FIGS. 4 and 5, and FIG. 8, and the system component architectures of FIG. 1 described above. Accordingly, such computer programs represent controllers of the computer system 1000. Where the invention is implemented using software, the software may be stored in a computer program product and loaded into computer system 1000 using removable storage drive 1014, interface 1020, hard drive 1012, or communications interface 1024.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternative Embodiments

It will be understood that embodiments of the present invention are described herein by way of example only, and that various changes and modifications may be made without departing from the scope of the invention.

For example, it is appreciated that aspects of the present embodiments may be configured in various implementation contexts. As one example, the object tracking system can be configured to track moving objects, such as drones (e.g. flying, terrestrial, under-water) or other autonomous and/or remote-controlled objects from great distances, each object having one or more markers affixed thereon, to efficiently and effectively enable the object to be tracked as described in the embodiments above. As another example, a CCTV or smart home system may be configured with, or adapted to embed, the object tracking system, which can be used to accurately track the movement and/or state of items, appliances, doors or windows and other entities, each object having one or more markers affixed thereon. As yet another example, those skilled in the art will appreciate that the object tracking system of the embodiments described above may be used for Augmented Reality (AR), Virtual Reality (VR) or Mixed Reality (MR) purposes of any kind, including, but not limited to gaming, education, training, sports or interactive art.

Reference in this specification to "one embodiment" are not necessarily all referring to the same embodiment, nor are separate or alternative embodiments mutually exclusive of other embodiments. In particular, it will be appreciated that aspects of the above described embodiments can be combined to form further embodiments. For example, alternative embodiments may comprise one or more of the training data generator, training module and object pose determiner aspects described in the above embodiments. Similarly, various features are described which may be exhibited by some embodiments and not by others. Yet further alternative embodiments may be envisaged, which nevertheless fall within the scope of the following claims.

The invention claimed is:

1. A computer-implemented method comprising:
receiving, by a user device, image data of a 3-dimensional ("3D") marker affixed to an object to be tracked, the 3D marker including at least first and second distinct surfaces, the first surface to convey radiation primarily in a first direction and the second surface to convey radiation primarily in a second direction different to the first direction, including image data from the distinct surfaces of the 3D marker;
providing, to a neural network stored on the user device, a set of input data derived from the image data;
generating, based on output of the neural network produced in response to receiving the set of input data, a pose descriptor indicative of an estimated pose of the 3D marker; and
providing an output by the user device based on the estimated pose of the 3D marker.

2. The method of claim 1, wherein the image data is received from a radiation sensor of the user device, and further comprising emitting radiation, from one or more sources of the user device, towards the 3D marker, wherein the radiation sensor receives reflected radiation from one or more reflective surfaces of the 3D marker.

3. The method of claim 2, further comprising filtering the reflected radiation using a filter of the user device provided between the 3D marker and the radiation sensor.

4. The method of claim 1, wherein the neural network outputs estimated transformation values relative to a base model of the 3D marker.

5. The method of claim 4, wherein the neural network further outputs data identifying one of a plurality of states of the 3D marker.

6. The method of claim 1, wherein the output provided by the user device is a rendered image of a 3D model of the object at the estimated pose.

7. The method of claim 1, wherein the output provided by the user device is a sequence of pose data points of the object in a motion capture system.

8. A 3-dimensional ("3D") marker for affixing to an object to be tracked by an image processing system, the 3D marker comprising:
at least first and second distinct surfaces, the first surface to convey radiation primarily in a first direction, and the second surface to convey radiation primarily in a second direction different to the first direction,
whereby the image processing system determines object pose from captured image data of at least a portion of the radiation conveyed from the first and/or second surface of the 3D marker affixed to the object.

9. The 3D marker of claim 8, wherein the second surface is provided at a normal direction that is at an angle to the normal direction of the first surface.

10. The 3D marker of claim 8, wherein each surface comprises a reflective or emitting element that conveys a corresponding pattern of radiation, and the corresponding pattern is defined by the geometry of the reflective or emitting element.

11. The 3D marker of claim 8, wherein each surface comprises a reflective material that conveys a corresponding pattern of radiation, and the corresponding pattern is defined by the geometry of the surface.

12. The 3D marker of claim 8, further comprising at least one surface in addition to the first and second surfaces, to convey radiation in respective directions different to the first and second directions, wherein the at least one surface is associated with at least one of a detectable trigger, switch, and event.

13. The 3D marker of claim 8, further comprising at least one source device to emit radiation in respective directions, wherein the source device is associated with at least one of a detectable trigger, switch, and event.

14. The 3D marker of claim 8, wherein the radiation is one of infrared radiation, ultraviolet light, and non-visible laser light.

15. The 3D marker of claim 8, wherein at least one surface comprises a deformable material.

16. A computer-implemented method comprising:
generating a plurality of computer-rendered images of a 3-dimensional ("3D") model of a 3D marker object at respective corresponding poses in a 3D coordinate space, the 3D marker object including a first surface to convey radiation primarily in a first direction and a second surface to convey radiation primarily in a second direction different to the first direction; and
providing the generated images and corresponding 3D poses as input to train a neural network model;
wherein an output of the trained neural network model is an estimated pose of the 3D marker object.

17. The method of claim 16, wherein the pose in 3D coordinate space comprises translation and rotation values relative to a base model of the 3D marker object.

18. The method of claim 16, further comprising generating a plurality of computer-rendered images of 3D models of a plurality of different 3D marker objects, and providing the generated images as input to train a second neural network model to determine a plurality of classes of the different 3D marker objects.

19. A computer system comprising:
- a processor configured to generate a plurality of computer-rendered images of a 3-dimensional ("3D") model of a 3D marker object at respective corresponding poses in a 3D coordinate space, the 3D marker object including a first surface to convey radiation primarily in a first direction and a second surface to convey radiation primarily in a second direction different to the first direction; and
- processing elements configured as a neural network model and configured to receive the generated images and corresponding 3D poses as inputs to train the neural network model, such that the network model, when so trained and when provided with a new input image that includes a new 3D marker object, provides an estimated pose of the new 3D marker object in the new input image.

20. The system of claim 19, wherein at least one of the poses comprises translation and rotation values relative to a base model of the 3D marker object.

\* \* \* \* \*